US010464697B1

(12) United States Patent
Miceli et al.

(10) Patent No.: US 10,464,697 B1
(45) Date of Patent: Nov. 5, 2019

(54) METHOD FOR LABELING PHARMACEUTICAL CONTAINER WITH COLOR ADVERTISING

(71) Applicant: Tri State Distribution, Inc., Sparta, TN (US)

(72) Inventors: David A. Miceli, Reno, NV (US); Joseph A. Miceli, Spencer, TN (US)

(73) Assignee: TRI STATE DISTRIBUTION, INC., Sparta, TN (US)

( * ) Notice: Subject to any disclaimer, the term of this patent is extended or adjusted under 35 U.S.C. 154(b) by 849 days.

(21) Appl. No.: 13/804,930

(22) Filed: Mar. 14, 2013

Related U.S. Application Data (63) Continuation-in-part of application No. 13/347,288, filed on Jan. 10, 2012.

(60) Provisional application No. 61/508,347, filed on Jul. 15, 2011.

(51) Int. Cl.
*B65B 1/02* (2006.01)

(52) U.S. Cl.
CPC ..................... *B65B 1/02* (2013.01)

(58) Field of Classification Search
USPC .......................................................... 40/310
See application file for complete search history.

(56) References Cited

U.S. PATENT DOCUMENTS

| | | | |
|---|---|---|---|
| 5,329,713 A | 7/1994 | Lundell | |
| 5,342,093 A | 8/1994 | Weemink | |
| 5,958,536 A | 9/1999 | Gelsinger et al. | |
| 6,036,231 A | 3/2000 | Foote et al. | |
| 6,240,394 B1 | 5/2001 | Uecker et al. | |
| 6,254,952 B1 | 7/2001 | Fox et al. | |
| 6,368,688 B1 | 4/2002 | Crum et al. | |
| 6,715,796 B2 | 4/2004 | Foote et al. | |
| 7,044,664 B2 | 5/2006 | Papetti | |
| 7,823,726 B1 | 11/2010 | Miceli et al. | |
| 8,181,370 B1 | 5/2012 | Mlceli et al. | |
| 2003/0112466 A1 | 6/2003 | Leonardi | |
| 2003/0193185 A1 | 10/2003 | Valley et al. | |
| 2005/0209915 A1 | 9/2005 | Saluccio | |
| 2006/0163869 A1 | 7/2006 | Alder et al. | |
| 2007/0213213 A1* | 9/2007 | Roth et al. | ......... 503/206 |
| 2008/0262930 A1 | 10/2008 | Miceli et al. | |
| 2010/0252474 A1 | 10/2010 | Miceli et al. | |

(Continued)

OTHER PUBLICATIONS

Revision Bulletin Dec. 1, 2007, Chapter 671: Containers—Performance Testing, The United States Pharmacopeial Convention Inc, 2007.*

(Continued)

*Primary Examiner* — David R Dunn
*Assistant Examiner* — Christopher E Veraa
(74) *Attorney, Agent, or Firm* — Luedeka Neely Group, P.C.

(57) ABSTRACT

A labeling method that enables a pharmacy to have pre-printed labels containing desired and custom color advertising and other color printings not achievable using the single color thermal printers used by pharmacies to print labels at the pharmacy, with the pharmacy being able to control the content of the pre-printed labels and to utilize the pre-printed labels as they desire with a single color printer to add printing specific to the patient and the prescription medicine.

2 Claims, 9 Drawing Sheets

(56) References Cited

U.S. PATENT DOCUMENTS

2012/0224225 A1* 9/2012 Banfield et al. ............. 358/1.18
2013/0346156 A1* 12/2013 Ho .............................. 705/7.33

OTHER PUBLICATIONS

Epson; "Enhancing Pharmacy Labeling with Color to Improve Patient Safety"; White Paper; Apr. 2011.

* cited by examiner

FIG 5B CONTINUED ON NEXT PAGE...

...FIG 5B CONTINUED FROM LAST PAGE

FIG. 6B

METHOD FOR LABELING PHARMACEUTICAL CONTAINER WITH COLOR ADVERTISING

CROSS-REFERENCE TO RELATED APPLICATIONS

This application is a continuation-in-part to co-pending U.S. application Ser. No. 13/347,288 filed Jan. 10, 2012, and entitled "Overflow Panel System for Pharmaceutical Container," which claimed priority to U.S. Provisional Application Ser. No. 61/508,347 filed Jul. 15, 2011, and entitled "Overflow Panel System for Pharmaceutical Container," both of which are incorporated by reference herein in their entireties.

FIELD

This disclosure relates generally to labeling of prescription containers. More particularly, this disclosure relates to methods for labeling prescription containers with labels having color advertising by providing a pre-printed label with color advertising and other color printing by commercially available printing means and subsequently printed with patient and medicine information by the pharmacy using either a laser or thermal printer.

BACKGROUND

Labels for prescription containers must include certain required information according to Federal and State regulations. This required information typically substantially corresponds to SIG information. SIG is short for Signa (Latin) which means "written," and this terminology is a remnant from the past when all prescriptions were handwritten and signed by the physician. SIG information refers to the information on the written prescription signed by the physician, which is (1) the name of the patient, (2) identification of the medicine, e.g., the name and strength of the medicine, and (3) brief instructions to the patient for taking the medicine.

In addition, pharmacies generally also include Purpose and Auxiliary information on the label. Purpose information is information that relates to why the medicine is taken—e.g., to reduce inflammation, for nausea, for pain, and the like. Auxiliary information involves information such as food interaction cautions, such as "Do Not Take With Dairy" in the case of tetracycline prescriptions, since tetracycline is made less effective when consumed with dairy.

SIG, Purpose, and Auxiliary information is information that is printed at the pharmacy at the time a prescription container is filled with specific prescription medicine for a specific patient. Currently, for economic and reliability reasons, pharmacies typically print prescription labels in black printing using either laser printers or direct thermal printers. While such printers are reliable and cost-effective, they limit the ability of the pharmacy to print any information or graphics in sharp detail; to print in color; or to do either inexpensively.

Accordingly, improvement is desired in the labeling of pharmaceutical containers. What is desired is a way to label pharmaceutical containers that enables bold, sharp, clear and inexpensive color printed information, such as color advertisements, to be included on prescription labels and that is compatible for subsequent printing by laser printers or thermal print heads at the pharmacy.

SUMMARY

The disclosure advantageously describes methods for enabling pharmacies to provide pharmaceutical containers with labels having color advertising.

The methods according to the disclosure enable a pharmacy to have pre-printed labels containing desired and custom color advertising and other color printings not achievable using the single color thermal or laser printers used by pharmacies to print labels at the pharmacy. The pharmacy can control the content of the pre-printed labels and selectively utilize the pre-printed labels as they desire with a single color thermal or laser printer to add printing specific to the patient and the prescription medicine.

In one aspect, the disclosure relates to a method for filling a prescription at a pharmacy. The method includes the steps of obtaining a pre-printed label prepared off-site from the pharmacy. The pre-printed label includes a label substrate that is suitable for printing using both laser printers and thermal printers. The pre-printed label has printing applied using a variety of commercially available printing methods, such as flexographic, offset, or direct digital printing, to provide color advertising on the label selected by the pharmacy to advertise goods or services. The prescription is then filled at the pharmacy by selecting a prescription medicine based on the prescription for dispensing in a container to a patient. Before the label is applied to the container, print is applied to the pre-printed label at the pharmacy using one or more of a thermal printer, an inkjet printer or a laser printer to add printing specific to the prescription medicine and the patient.

The methods of the disclosure enable a pharmacy to have pre-printed labels containing desired and custom color advertising and other color printings not achievable using the single color printers used by pharmacies to print labels at the pharmacy. The pharmacy is able to control the content of the pre-printed labels and to utilize the pre-printed labels as they desire with a single color printer to add printing specific to the patient and the prescription medicine.

BRIEF DESCRIPTION OF THE DRAWINGS

Further advantages of the disclosure are apparent by reference to the detailed description in conjunction with the figures, wherein elements are not to scale so as to more clearly show the details, wherein like reference numbers indicate like elements throughout the several views, and wherein.

DETAILED DESCRIPTION

The disclosure relates to methods for filling prescription containers utilizing one-piece pre-printed labels with color advertising and other color printing for pharmaceutical containers as selected by the pharmacy. The pre-printed labels are printed as by an off-site provider using a variety of printing methods, including flexographic, offset, direct digital or other commercially available methods and are configured to be suitable for use on various prescription containers, including conventional round prescription containers. The pre-printed labels are supplied to a pharmaceutical provider, such as a central fill pharmacy or retail store pharmacy. The pharmaceutical provider or pharmacy may select the content and arrangement of the printing on the pre-printed labels. As will be appreciated, actions indicated herein as being taken by the pharmacy will be understood to be actions taken by staff or other persons associated with the pharmacy.

When the prescription is filled at the pharmacy, staff of the pharmacy selects a prescription medicine based on the prescription for dispensing in a container to a patient and prints on the pre-printed label at the pharmacy using a single color thermal printer to add printing specific to the prescription medicine and the patient. It should be noted that color laser printers can also be used at the pharmacy to also add small amounts of supplemental color to the label, but given the higher cost of color laser printers, their much slower print time, and the expensive cost of color printing, the overwhelming majority of printers—laser or thermal—used in pharmacies only print in black. The label is then applied to the container and the prescription medicine is dispensed for use by the patient. The information added by the pharmacy is SIG, Purpose, and Auxiliary information specific to the patients and the medicines that will be supplied in the containers.

Figure 1A:
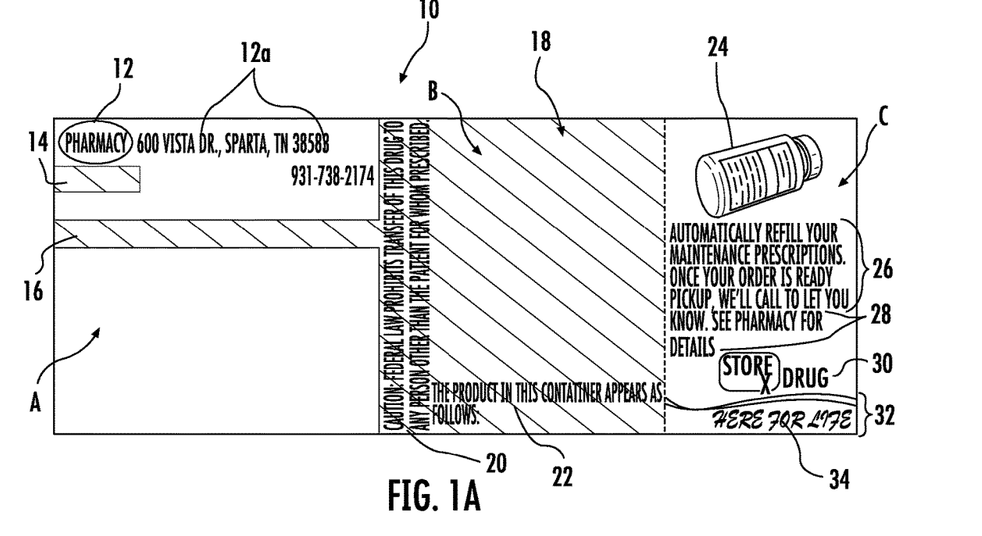
FIG. 1A shows a one-piece pre-printed label with color advertising for pharmaceutical containers as provided to a pharmacy according to the disclosure.
Figure 1B:
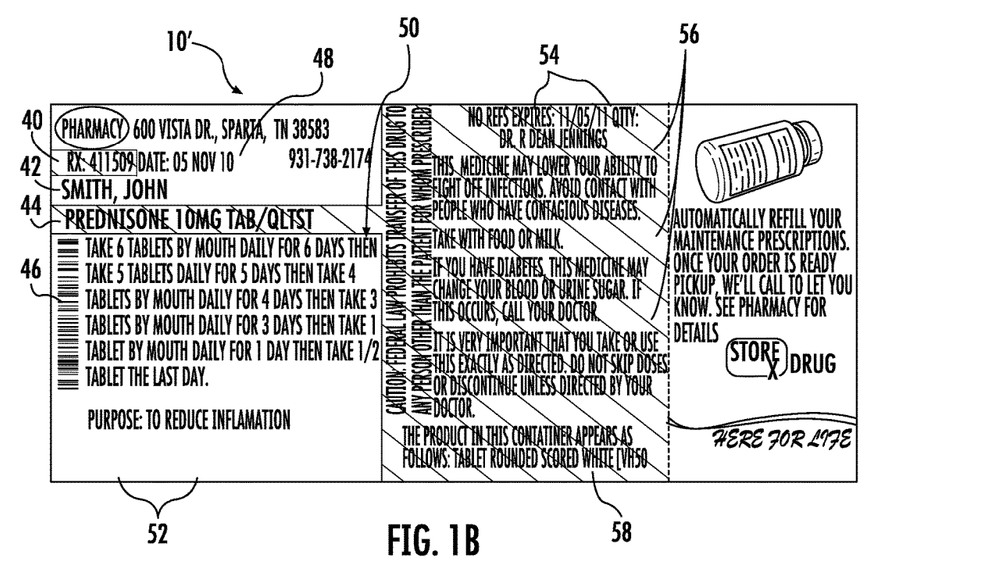
FIG. 1B shows the label of FIG. 1A including printing added by the pharmacy to which the label was provided.

With reference to FIG. 1A, there is shown a pre-printed label 10 as it will be supplied to a pharmaceutical provider. The label 10 is made of a paper substrate that is suitable for printing using both laser printers (color or just black) and thermal head printers, such as thermal printing paper label stock or peel and stick laser printing labels. FIG. 1B shows the label 10 after the pharmacy has printed SIG, Purpose, and Auxiliary information on the label 10 using a single color thermal head printer, thus providing a final label 10'.

As seen in FIG. 1A, the label 10 has three zones A, B, and C, each of which is pre-populated by a label supplier with color printing. Zone A has printing 12, 12a, 14, and 16. Zone B has color printing 18, 20, and 22. Zone C has color printing 24, 26, 28, 30, and 32. The color printing 12-32 is all performed using commercially available color printing methods mentioned previously. In FIG. 1B, the pharmacy has added to the zones A-C black or single color printing 40, 42, 44, 46, 48, 50, 52, 54, 56, and 58, all performed by the pharmacy using a single color thermal printer.

Returning to FIG. 1A, in Zone A, the color printing 12 is a color logo utilizing the colors red, white, black, purple, and yellow and having fonts and font effects that cannot be provided by a thermal head printer. In the example shown, the logo is the logo of the pharmacy, e.g., Miceli's Pharmacy featuring a stylized RX symbol in a red oval over which is printed the words Miceli's Pharmacy. To the right of the printing 12 is printing 12a, such as address and phone information of the pharmacy. The printing 12a can be in any color, but preferably black, with the phone information in bold. The printing 14 and 16 are each a yellow bar. The printing 14 and 16 will subsequently be overprinted by the pharmacy to highlight the prescription number and the identification of the prescription. The printings 12-16 each run in the length direction of the label 10.

In zone B, printing 18 covers the entirety of zone B and is in yellow. Much of printing 18 is subsequently printed over by the pharmacy with the printing 18 serving as highlighting of the printing provided by the pharmacy. Printing 20 and 22 are also highlighted by the printing 18. Printing 20 is in the color red and runs perpendicular to the length direction of the label 10 and provides a legal warning: CAUTION: Federal law prohibits transfer of this drug to any person other than the patient for whom prescribed. Printing 22 states: THE PRODUCT IN THIS CONTAINER APPEARS AS FOLLOWS: Below printing 22 the pharmacy will provide a written description of the appearance of the prescription medicine.

In Zone C, various advertisement printing is provided. In the example of FIG. 1A, the color advertisement printing is advertisement of an automatic refill service offered by the pharmacy. For example, printing 24 is a color image of a prescription container to provide a visual reminder of the prescription, printing 26 states in blue italic font: "Automatically refill your maintenance prescriptions. Once your order is ready for pickup, we'll call to let you know." Printing 28 is in red no-italic font larger than the font of printing 26, and states: "See pharmacy for details." Printing 30 is a color logo of the pharmacy providing the automatic refill service. In this case, the logo is for Hartig Drug in red, white, and blue coloration, but it will be appreciated that the logo may be the same as the logo of printing 12. Printing 32 is a color design provided by a red wavy band with gray, white and blue bordering, over which is provided a slogan 34, in this case, the slogan HERE FOR LIFE! in white lettering.

The pre-printed label 10 as supplied to the pharmaceutical provider is thereafter printed at the pharmacy to provide the label 10'. The label 10' is provided by printing onto the pre-printed label 10 using a single color thermal printer to add SIG, Purpose, and Auxiliary information specific to the patients and the medicines that will be supplied in a container to which the label 10' is affixed.

For example, with reference to FIG. 1B, to provide the label 10', printing 40, 42, 44, 46, 48, 50, and 52 is added by the pharmacy to the zone A, and printing 54, 56, and 58 is added to the zone B. All of the printing 40-58 is in a single color, typically black, oriented to run in the length direction of the label 10.

In the zone A, the printing 40 provides the prescription number and the printing 42 provides the name of the patient. The printing 40 and 42 overlies the pre-printing 14 and 16, such as yellow highlighting, of the label 10. The printing 44 provides identification of the medicine, e.g., the name and strength of the medicine, such as Prednisone 10 MG TAB/QLTST. Printing 46 is a barcode having information specific to medication name and dose, or other information relating to the medicine or the patient or both. The printing 48 provides the date the prescription is filled. The printing 50 provides instructions to the patient for taking the medicine. The printing 52 provides the purpose or intended use of the prescription medicine, e.g., To reduce inflammation.

In the zone B, the printing 54 provides refill, expiration, and prescribing physician information. The printing 56 provides includes warning or auxiliary information such as "This medicine may lower your ability to fight off infections. Avoid contact with people who have contagious diseases." "Take with food or milk." "If You Have Diabetes, This Medicine May Change Your Blood Or Urine Sugar. If This Occurs, Call Your Doctor." "It is very important that you take or use this exactly as directed. Do not skip doses or discontinue unless directed by your doctor." The printing 58 provides a written description of the appearance of the prescription medicine, such as for Prednisone, "tablet rounded scored white (VH50)."

In accordance with the disclosure, the pre-printed label 10 as detailed above is provided to the pharmacy. The pharmacy then adds printing specific to the patient and the prescription medicine using a laser or thermal printer to provide the label 10' which is then applied to a prescription container, such as a round container. Typically, multiple ones of the labels 10 are provided in bulk to the pharmacy for feeding through a thermal printer. For example, multiple ones of the labels 10 may be provided on a single sheet.

Figure 2A:
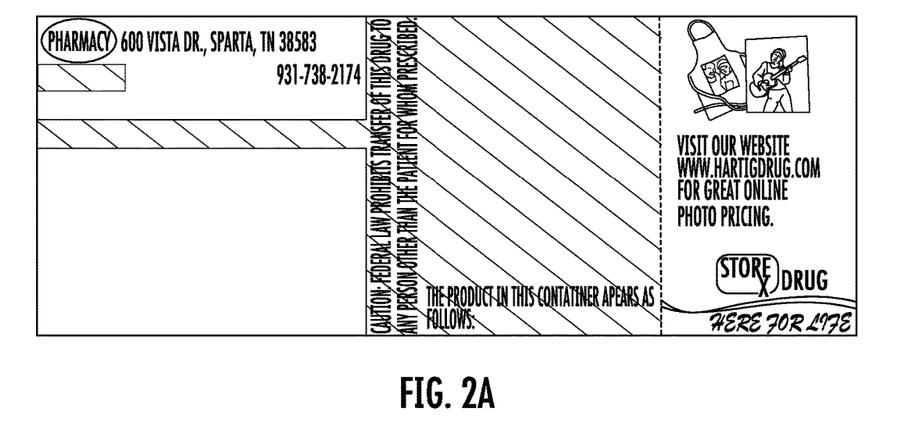
FIG. 2A shows a one-piece pre-printed label with color advertising for pharmaceutical containers as provided to a pharmacy according to the disclosure.
Figure 2B:
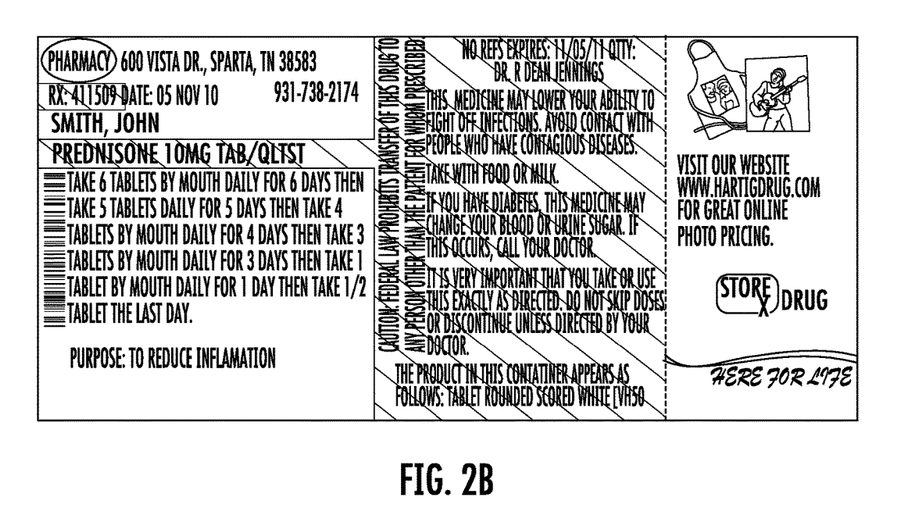
FIG. 2B shows the label of FIG. 2A including printing added by the pharmacy to which the label was provided.
Figure 3A:
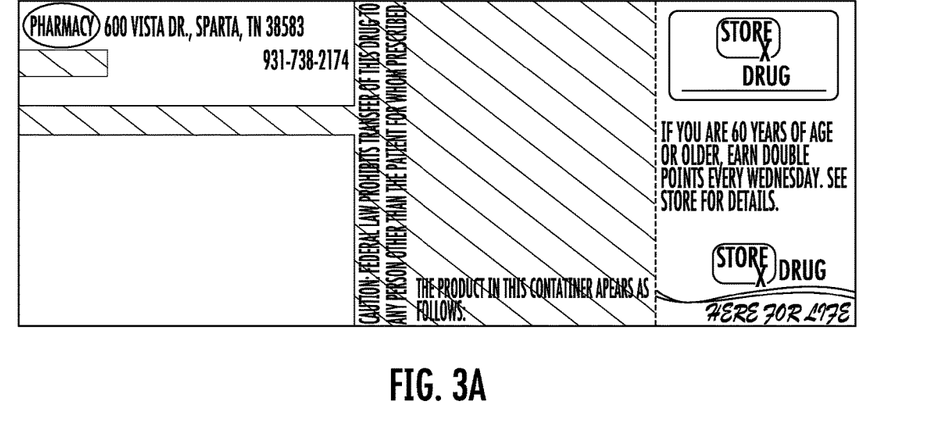
FIG. 3A shows a one-piece pre-printed label with color advertising for pharmaceutical containers as provided to a pharmacy according to the disclosure.
Figure 3B:
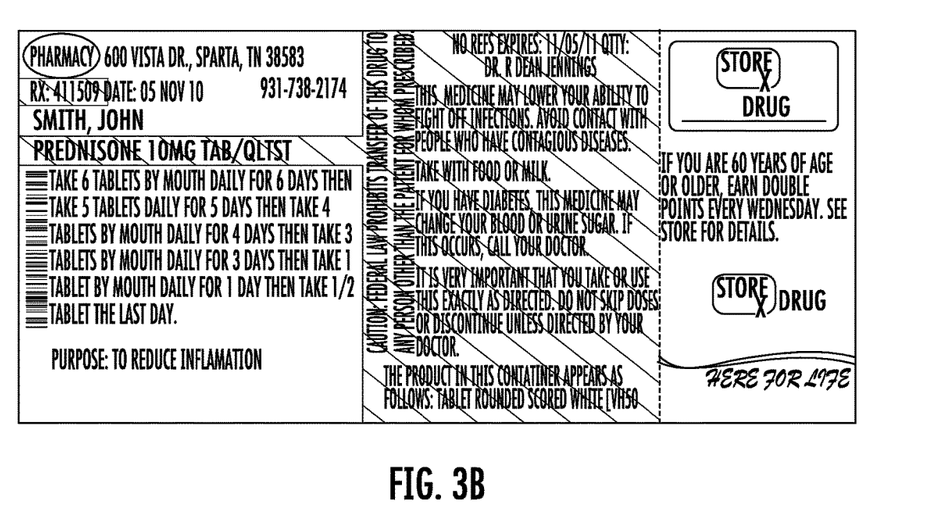
FIG. 3B shows the label of FIG. 3A including printing added by the pharmacy to which the label was provided.
Figure 4A:
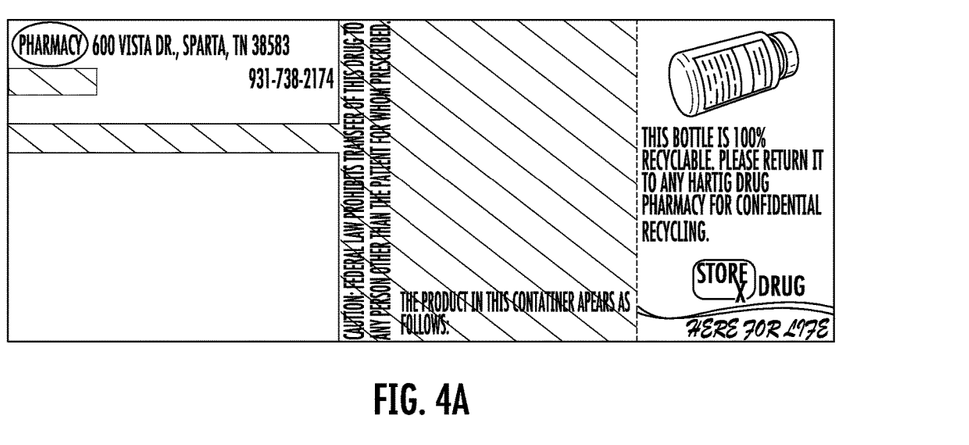
FIG. 4A shows a one-piece pre-printed label with color advertising for pharmaceutical containers as provided to a pharmacy according to the disclosure.
Figure 4B:
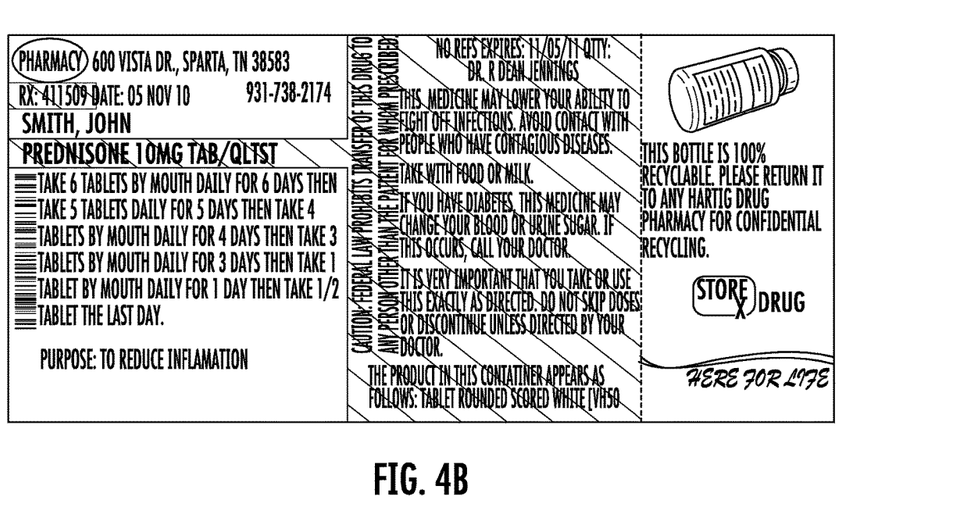
FIG. 4B shows the label of FIG. 4A including printing added by the pharmacy to which the label was provided.
Figure 5A:
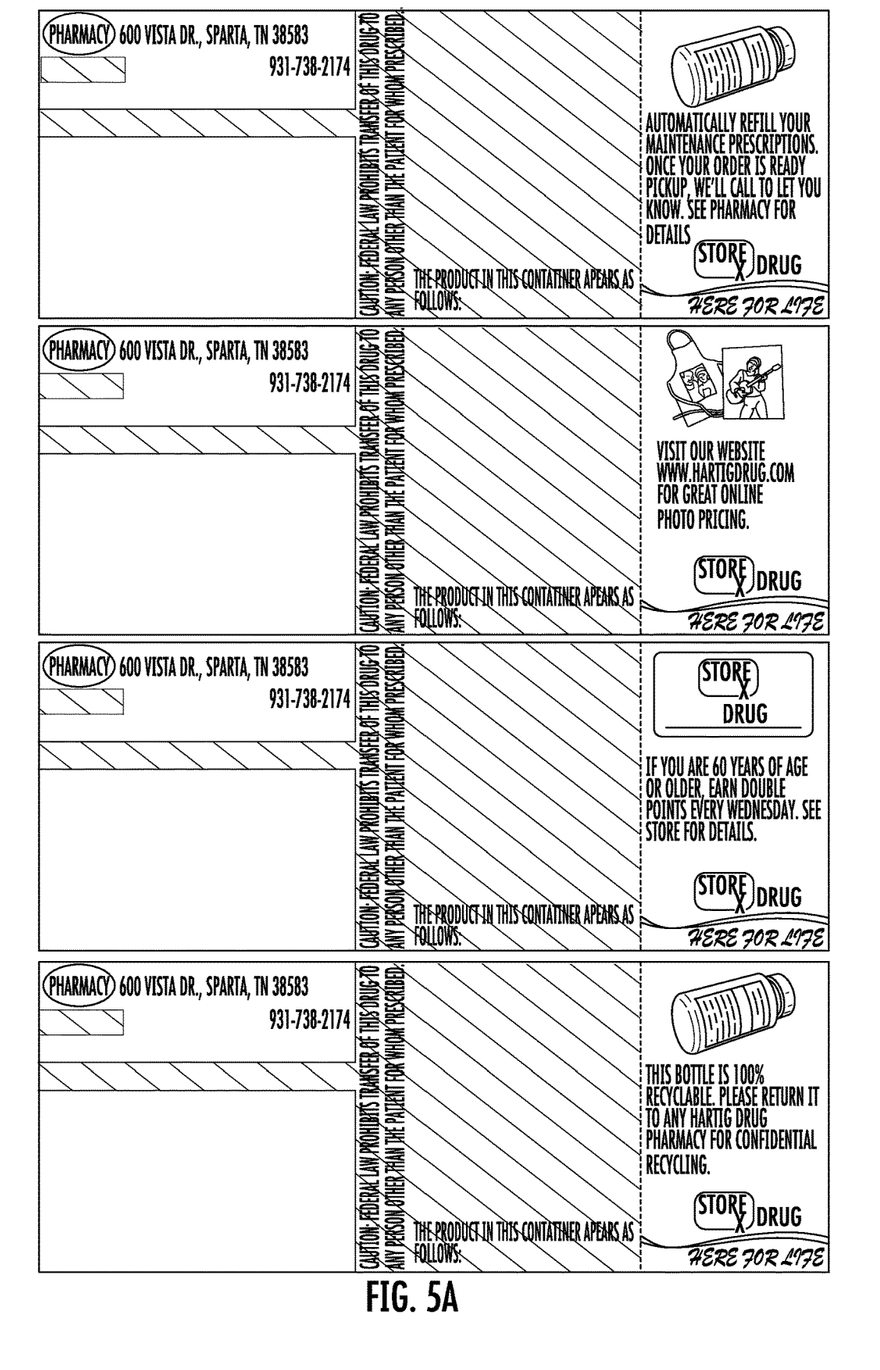
FIG. 5A shows a sheet of one-piece pre-printed labels with color advertising for pharmaceutical containers as provided to a pharmacy according to the disclosure.
Figure 5B:
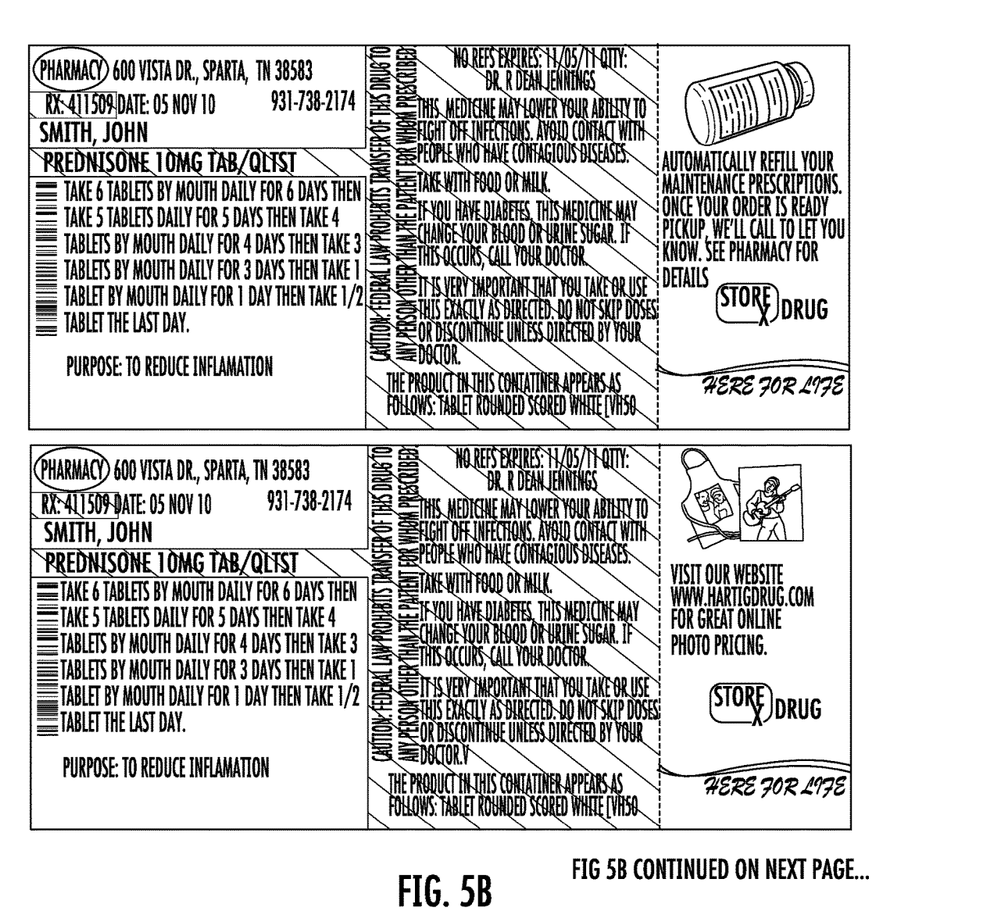
FIG. 5B shows the sheet of FIG. 5A including printing added by the pharmacy.

Each label 10 may be the same or may differ. For example, FIGS. 2A, 3A, and 3A show variations of the label 10 having different printing in Zone C, representing color advertisement printing. FIGS. 2B, 3B, and 4B show the labels of FIGS. 2A-4A after they have been printed at the pharmacy using laser or thermal printing. The advertisement printing in zone C may be selected by the pharmacy and sheets of the labels may be provided to the pharmacy with the same advertisement printing on each one of the labels 10, or different on each, or as otherwise combined as selected by the pharmacy. In this regard, FIG. 5A shows a sheet as provided to the pharmacy. FIG. 5b shows the printing as subsequently provided by the pharmacy using a thermal printer.

In this regard, it will be appreciated that the pharmacy may desire one or a plurality of different advertisements. In the event of different advertisements, the pharmacy may desire to target certain advertisements to certain classes of patients. This targeting may be accomplished manually or by use of a computer to match available advertisements to patients based on criteria such as age, prescription, address, or other criteria. For example, with regard to the advertisement represented by the printing 26 on FIG. 1A relating to automatic prescription refill services for maintenance prescriptions, selection of this advertisement printing may be desired in connection with prescriptions that represent maintenance prescriptions. In the case of the label of FIG. 2A, there is advertisement printing for online photos. This advertisement may be desirably indicated in the case of prescriptions for patients known to have children or for prescriptions for minor patients. In the case of the label of FIG. 3A, this label includes advertisement printing for double points being offered to persons 60 years of age or older. In a similar manner, this advertisement may be selected for use in the case of patients who are 60 years of age or older. As will be appreciated, the pharmacy may desirably select to provide a label having a desired advertisement based on patent, medicine, or other criteria. For example, advertisements for stores unrelated to the pharmacy may be provided, and such advertisements selected based on geographic or age or other patient information.

Figure 6A:
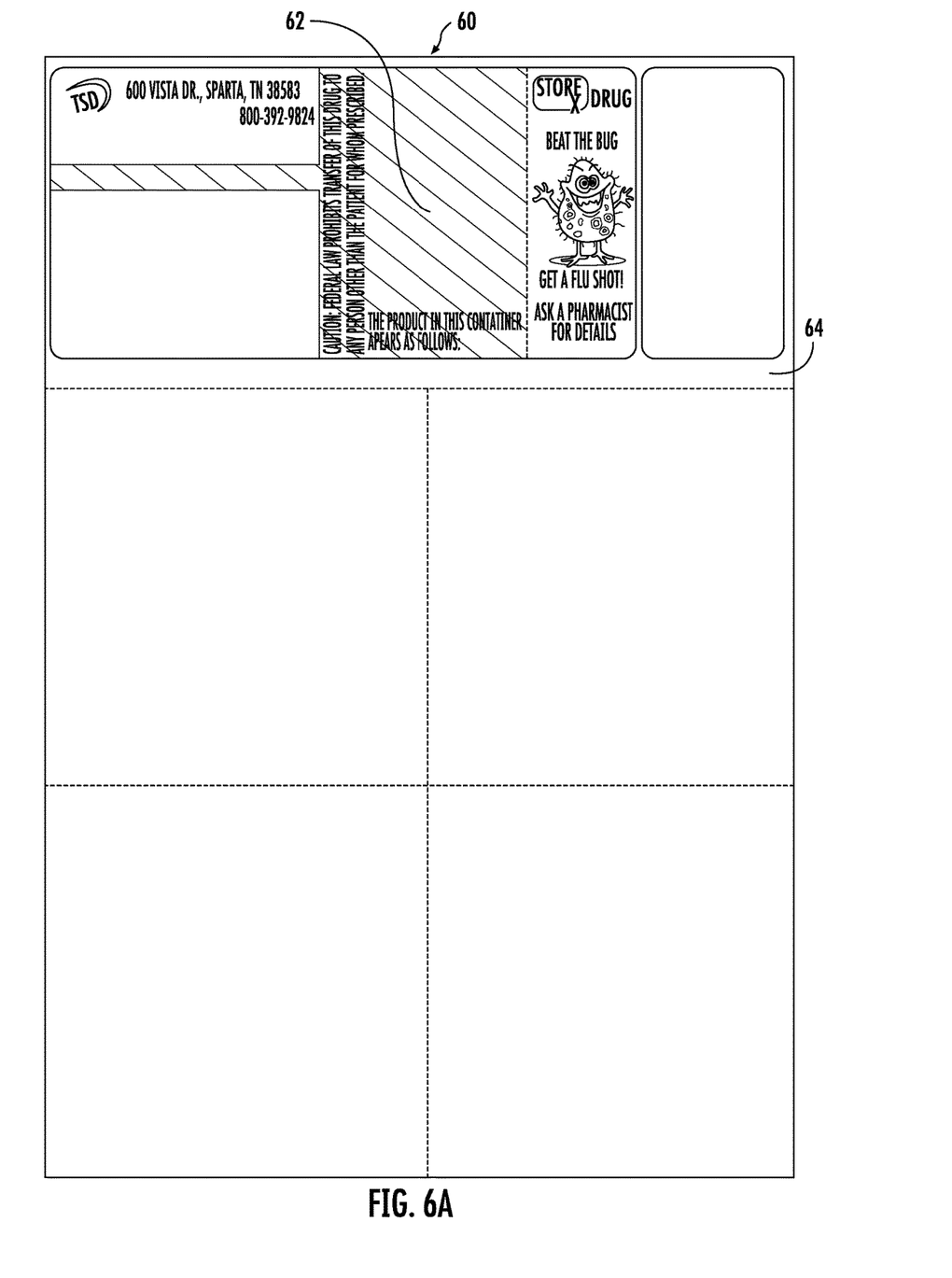
FIG. 6A shows a two-piece pre-printed label with color advertising for pharmaceutical containers as provided to a pharmacy according to the disclosure.
Figure 6B:
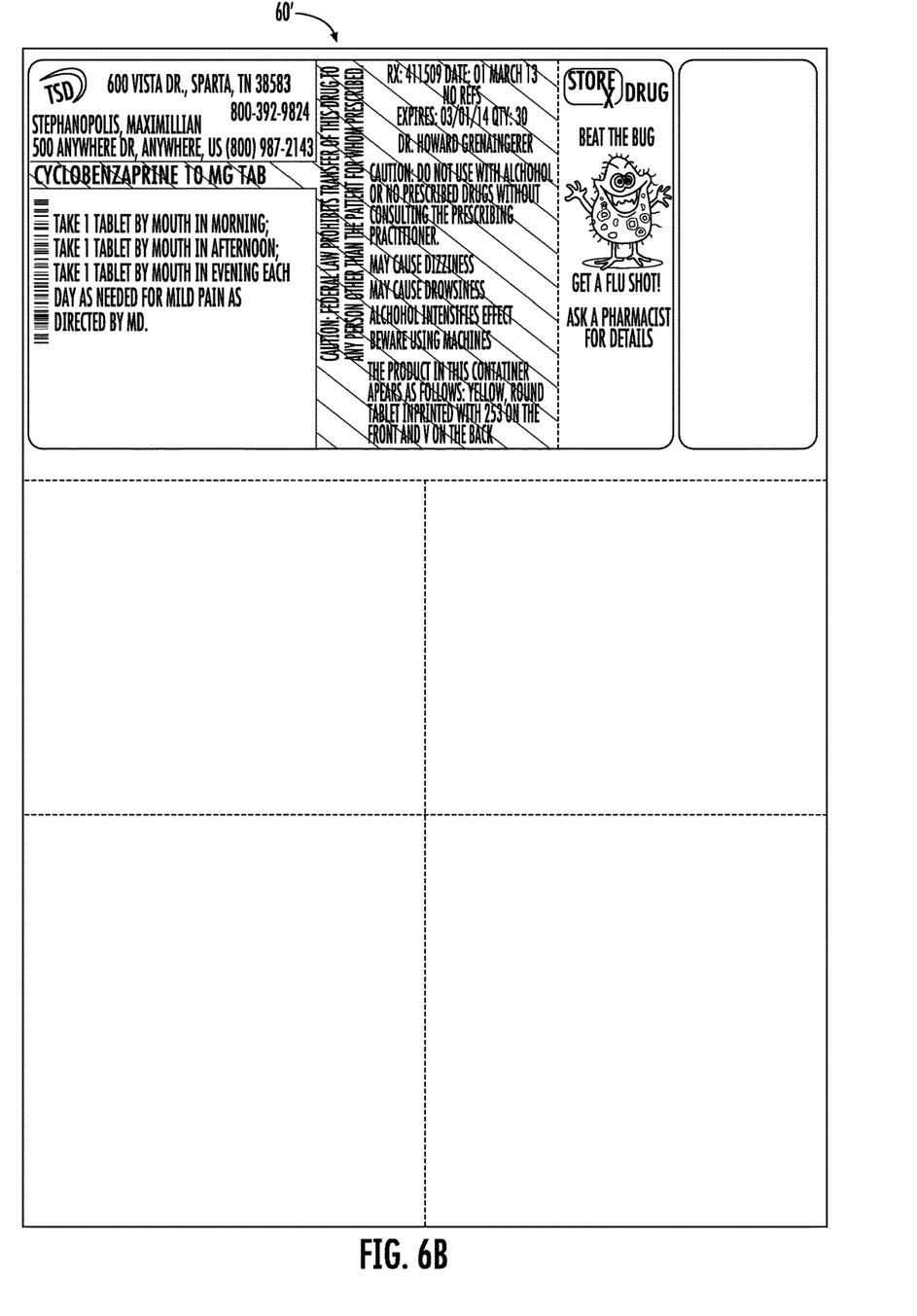
FIG. 6B shows the label of FIG. 6A including printing added by the pharmacy.

FIGS. 6A and 6B show use of a two-piece label 60, 60' in accordance with the disclosure. In FIG. 6A, the label 60 is a laser label having two substrates; a peel and stick section 62 mated to a bond section 64. The peel and stick section 62 is pre-printed in the manner of the prior embodiments as shown in FIG. 6A to provide the label 60. The pre-printed label 60 is then supplied to the pharmaceutical provider and thereafter printed at the pharmacy to provide the label 60', as shown in FIG. 6B.

As will be appreciated, labeling methods according to the disclosure enable a pharmacy to have pre-printed labels containing desired and custom color advertising and other color printings not achievable using the single color printers used by pharmacies to print labels at the pharmacy, with the pharmacy being able to control the content of the pre-printed labels and to utilize the pre-printed labels as they desire with a single color thermal or laser printer to add printing specific to the patient and the prescription medicine.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A method for filling a prescription for a patient at a pharmacy, the method comprising:
    receiving at a label supplier off-site from the pharmacy a plurality of selected advertisements;
    providing at the pharmacy a plurality of pre-printed labels each having at least a first zone and a second zone, each pre-printed label including one of the selected advertisements printed in the second zone by the label supplier off-site from the pharmacy, each pre-printed label including a different selected advertisement;
    selecting at the pharmacy one of the plurality of pre-printed labels based at least in part on a desired advertisement for the prescription;
    printing at the pharmacy prescription information specific to the prescription and the patient in the first zone of the selected pre-printed label having the desired advertisement so that the selected advertisement of the second zone does not interfere with the prescription information of the first zone; and
    applying the selected pre-printed label having the desired advertisement and prescription information printed thereon on a container to be given to the patient.

2. The method of claim 1 wherein the first and second zone are separated by a perforated line.

* * * * *